United States Patent Office 3,396,166
Patented Aug. 6, 1968

3,396,166
7-AMINOMETHYL-8-HYDROXY-5-OXO-1,2,3,4-TET-
RAHYDROBENZOPYRANO[3,4-c]PYRIDINES
James W. Bolger, Canoga Park, Calif., assignor to Rexall
Drug and Chemical Company, Los Angeles, Calif., a
corporation of Delaware
No Drawing. Filed June 14, 1965, Ser. No. 463,951
7 Claims. (Cl. 260—247.2)

ABSTRACT OF THE DISCLOSURE

This invention is directed to 7-aminomethyl-8-hydroxy-5-oxo-1,2,3,4-tetrahydrobenzopyrano[3,4-c]pyridines and their 7-pyrrolidinomethyl, 7-piperidinomethyl, 7-morpholinomethyl and 7-(4-methylpiperazino)methyl-substituted equivalents. These compounds have activity as analgesic agents and exert an effect upon the central nervous system. The compounds are prepared by the Mannich reaction.

This invention relates to compositions of matter classified in the art of chemistry as substituted benzopyrano-pyridines.

The invention sought to be patented is described as residing in the concept of a chemical compound having a molecular structure in which the 3-lower alkyl-8-hydroxy-5-oxo - 1,2,3,4 - tetrahydrobenzopyrano[3,4-c]pyridine nucleus bears at the 7-position a di-lower alkyl-aminomethyl radical, and the hereinafter described equivalents thereof.

As used throughout the specification and in the claims, the term "lower alkyl" embraces both straight and branched chain alkyl radicals containing from 1 to 6 carbon atoms, for example methyl, ethyl, propyl, isopropyl, n-butyl, n-amyl, n-hexyl, 2-ethylbutyl, 2,3-dimethylbutyl, and the like, and the term "lower alkenyl" embraces straight and branched chain alkenyl radicals containing from 2 to 6 carbon atoms, for example vinyl, allyl, 1-butenyl, 1-hexenyl, 2,3-di-methyl-1-butenyl, 2-ethyl-1-butenyl and the like.

The tangible embodiments of this invention possess the inherent general physical properties of being solid crystalline materials. Elemental analysis, as well as ultraviolet and infra-red spectral data and Nuclear Magnetic Resonance (NMR) data, taken together with the aforementioned physical properties, nature of the starting materials and mode of synthesis, positively confirm the structure of the compounds sought to be patented.

The tangible embodiments of this invention possess the inherent applied use characteristics of causing significant pharmacological effects upon the central nervous system of animals and of possessing significant pharmacological activity without adverse toxicity as analgesic agents.

The manner and process of making and using the invention will now be generally described so as to enable one skilled in the art of chemistry to make and use the same as follows:

The preparation of the tangible embodiments of this invention is illustrated by the following reaction sequence:

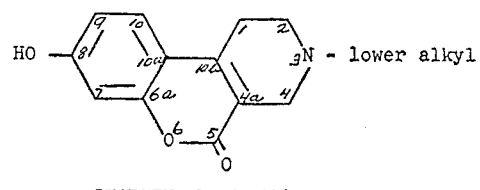

STARTING MATERIAL

Mannich
$R_1R_2NH$ - HCHO

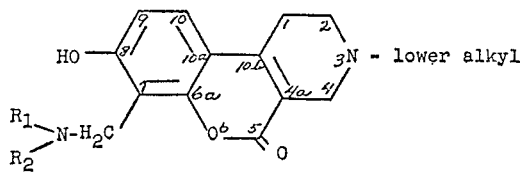

FINAL PRODUCT wherein —$NR_1R_2$ is dilower alkylamino or its hereinafter described equivalents.

In accordance with the above reaction sequence an 8 - hydroxy-3-lower alkyl-5-oxo-1,2,3,4-tetrahydrobenzo-pyrano[3,4-c]pyridine is subjected to the well-known Mannich reaction, thereby to produce the 7-di-lower alkylaminomethyl-8-hydroxy-3-lower alkyl-5-oxo-1,2,3,4-tetrahydrobenzopyrano[3,4-c]pyridines which comprise the tangible embodiments of this invention. The reaction is carried out by treating the starting material with an appropriate di-lower alkylamine, for example dimethyl-amine, diethylamine and the like, in the presence of a source of formaldehyde, for example paraformaldehyde, in an inert organic solvent, for example methanol, ethanol, tetrahydrofuran and the like, at a temperature of up to the reflux temperature of the solvent. The product is recovered from the reaction mixture by conventional techniques of extraction, crystallization, and the like.

The starting materials for the preparation of the tangible embodiments of this invention are known compounds which together with a method for their synthesis, are described by Anker and Cook (J. Chem. Soc. 1946: 58-62).

In carrying out the reaction, a mono-lower alkylamine such as methylamine, ethylamine, isopropylamine and the like, a phenyl-lower alkylamine such as benzylamine, phenethylamine and the like, or a saturated organic base of the formula HNRR wherein each R is lower alkyl linked together through a methylene bridge or a hetero-oxygen, nitrogen or sulfur atom and lower alkyl substituted derivatives thereof, such as pyrrolidine, piperidine, piperazine, morpholine, 2-methylmorpholine, 3-ethylpyrrolidine, N-methylpiperazine and the like are the full equivalents of the di-lower alkylamine yielding final products bearing $NR_1R_2$ substitution corresponding to the reactant used which have the same utility as the final products prepared utilizing a di-lower alkylamine. In addition, lower aliphatic aldehydes of the formula RHCO wherein R is lower alkyl may be employed, such as acetaldehyde, propionaldehyde, butyraldehyde and the like, thereby to prepare final products wherein the methylene bridge linking the $NR_1R_2$ radical with the 7-position of the nucleus bears a lower alkyl substituent (R) which are the full equivalents to the final products bearing an unsubstituted methylene bridge.

Starting materials bearing one or more lower alkyl substituents at the 1, 2 and/or 4 position, and/or starting materials wherein the nitrogen atom of the pyridine ring bears a lower alkenyl radical in place of lower alkyl are prepared by the same techniques described in the Anker and Cook paper referred to hereinabove, such lower alkyl and/or N-lower alkenyl substituted starting materials being the full equivalents of the specific starting materials depicted in the hereinabove described reaction with a Mannich base, thereby resulting in final products bearing the same alkyl substitution at the 1, 2 and/or 4 position, and/or lower alkenyl substitution on the nitrogen atom of the pyridine ring, as in the starting materials. Such products have the same utility as the specific products depicted in the above reaction sequence and are included within the scope of the tangible embodiments of this invention.

The tangible embodiments of this invention, may, if desired, be converted into their nontoxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy acids and polybasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a nontoxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventor for carrying out his invention will now be set forth as follows:

Example 1.—7 - dimethylaminomethyl - 8 - hydroxy - 3 - methyl-5-oxo-1,2,3,4 - tetrahydrobenzopyrano[3,4 - c] pyridine 8-hydroxy-3-methyl-5-oxo - 1,2,3,4 - tetrahydrobenzopyrano[3,4-c]pyridine (23.1 g., 0.1 mole), 35% aqueous dimethylamine (14.1 g., approximately 10% molar excess) and paraformaldehyde (3.0 g., 0.1 mole) in methanol (300 ml.) are stirred for 96 hours at room temperature and then refluxed for 2 hours. The mixture is then filtered and the filtrate concentrated to about 75 ml. A crystalline solid forms that is recrystallized from absolute ethanol/chloroform to yield 16 g. (56%) of white crystalline product, M.P. 183°–186° C.

*Analysis.*—Calculated for $C_{16}H_{20}N_2O_3$: C, 66.64%; H, 6.99%; N, 9.72%. Found: C, 66.52%; H, 6.98%; N, 9.92%.

The following examples illustrate the preparation of other tangible embodiments of this invention:

Example 2.—8-hydroxy-3-methyl-5-oxo-7-pyrrolidinomethyl-1,2,3,4-tetrahydrobenzopyrano[3,4-c]pyridine In the same manner as described in Example 1, 8-hydroxy-3-methyl-5-oxo-1,2,3,4 - tetrahydrobenzopyrano-[3,4-c]pyridine (23.1 g., 0.1 mole) in methanol (300 ml.) is treated with pyrrolidine (7.1 g.) in the presence of paraformaldehyde (3.0 g., 0.1 mole) to yield 16 g. (54%) of product that is recrystallized from hot isopropyl alcohol, M.P. 147°–148° C.

Example 3.—8-hydroxy-3-methyl-5-oxo - 7 - piperidinomethyl-1,2,3,4-tetrahydrobenzopyrano[3,4-c]pyridine In the same manner as described in Example 1, 8-hydroxy-3-methyl-5-oxo-1,2,3,4 - tetrahydrobenzopyrano-[3,4-c]pyridine (23.1 g., 0.1 mole) in methanol (300 ml.) is treated with piperidine (8.5 g.) in the presence of paraformaldehyde (3.0 g., 0.1 mole) to give a white solid that is recrystallized from absolute alcohol/chloroform in a yield of 22.5 g. (69%) of pale yellow crystalline solid, M.P. 185°–189° C.

*Analysis.*—Calculated for $C_{19}H_{24}N_2O_3$: C, 69.49%; H, 7.37%; N, 8.53%. Found: C, 69.44%; H, 7.21%; N, 8.70%.

Example 4.—8-hydroxy-3-methyl-7-morpholinomethyl-5-oxo-1,2,3,4-tetrahydrobenzopyrano[3,4-c]pyridine In the same manner described in Example 1, 8-hydroxy-3-methyl-5-oxo - 1,2,3,4 - tetrahydrobenzopyrano [3,4-c]pyridine (23.1 g., 0.1 mole) in methanol (300 ml.) is treated with morpholine (8.7 g.) in the presence of paraformaldehyde (3.0 g., 0.1 mole) to give a white crystalline solid that is recrystallized from methylene chloride in the form of pale yellow crystals, M.P. 165°–167° C.

*Analysis.*—Calculated for $C_{18}H_{22}N_2O_4$: C, 65.44%; H, 6.71%; N, 8.48%. Found: C, 65.55%; H, 6.73%; N, 8.34%.

Example 5.—8-hydroxy-3-methyl-7-(4 - methylpiperazinomethyl-5-oxo-1,2,3,4 - tetrahydrobenzopyrano[3,4 - c] pyridine In the same manner as described in Example 1, 8-hydroxy-3-methyl-5-oxo - 1,2,3,4, - tetrahydrobenzopyrano [3,4-c]-pyridine (23.1 g., 0.1 mole) in methanol (400 ml.) is treated with N-methylpiperazine (10 g.) in the presence of paraformaldehyde (3.0 g., 0.1 mole) to yield, after recrystallization from ethanol, 16 g. (47%) of white crystalline solid, M.P. 178°–180° C.

*Analysis.*—Calculated for $C_{19}H_{25}N_3O_3$: C, 66.45%; H, 7.34%; N, 12.24%. Found: C, 66.58%; H, 7.35%; N, 12.06%.

Example 6.—7-diethylaminomethyl-8-hydroxy-3 - methyl-5-oxo-1,2,3,4-tetrahydrobenzopyrano[3,4-c]pyridine In the same manner as described in Example 1, 8-hydroxy-3-methyl-5-oxo-1,2,3,4-tetrahydrobenzopyrano[3,4-c]pyridine (23.1 g., 0.1 mole) in methanol (300 ml.) is treated with diethylamine (8.03 g., 10% excess) in the presence of paraformaldehyde (3.0 g., 0.1 mole) to yield 13 g. (41%) of cream colored crystals, M.P. 100°–102° C.

The subject matter which the applicant regards as his invention is particularly pointed out and distinctly claimed as follows:

1. 7-dimethylaminomethyl-8-hydroxy-3-methyl-5-oxo-1,2,3,4-tetrahydrobenzopyrano[3,4-c]pyridine.
2. 7-diethylaminomethyl-8-hydroxy-3-methyl-5-oxo-1,2,3,4-tetrahydrobenzopyrano[3,4-c]pyridine.
3. 8-hydroxy-3-methyl-5-oxo-7-pyrrolidinomethyl-1,2,3,4-tetrahydrobenzopyrano[3,4-c]pyridine.
4. 8-hydroxy-3-methyl-5-oxo-7-piperidinomethyl-1,2,3,4-tetrahydrobenzopyrano[3,4-c]pyridine.

5. 8-hydroxy-3-methyl-7-morpholinomethyl-5-oxo 1,2,3,4-tetrahydrobenzopyrano[3,4-c]pyridine.

6. 8-hydroxy-3-methyl-7-(4-methylpiperazinomethyl)- 5-oxo-1,2,3,4-tetrahydrobenzopyrano[3,4-c]pyridine.

7. A compound of the formula

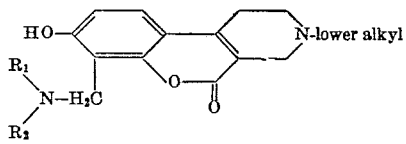

wherein $NR_1R_2$ is a member selected from the group consisting of mono-lower alkylamino, di-lower alkylamino, pyrrolidino, piperidino, piperazino, morpholino, 2-methylmorpholino, 3-ethylpyrrolidino and N-methylpiperazino.

No references cited.

NICHOLAS S. RIZZO, *Primary Examiner.*

JOSE TOVAR, *Assistant Examiner.*